No. 705,586. Patented July 29, 1902.
J. H. HOPKINS.
PILE DRIVER.
(Application filed Oct. 22, 1901.)
(No Model.)
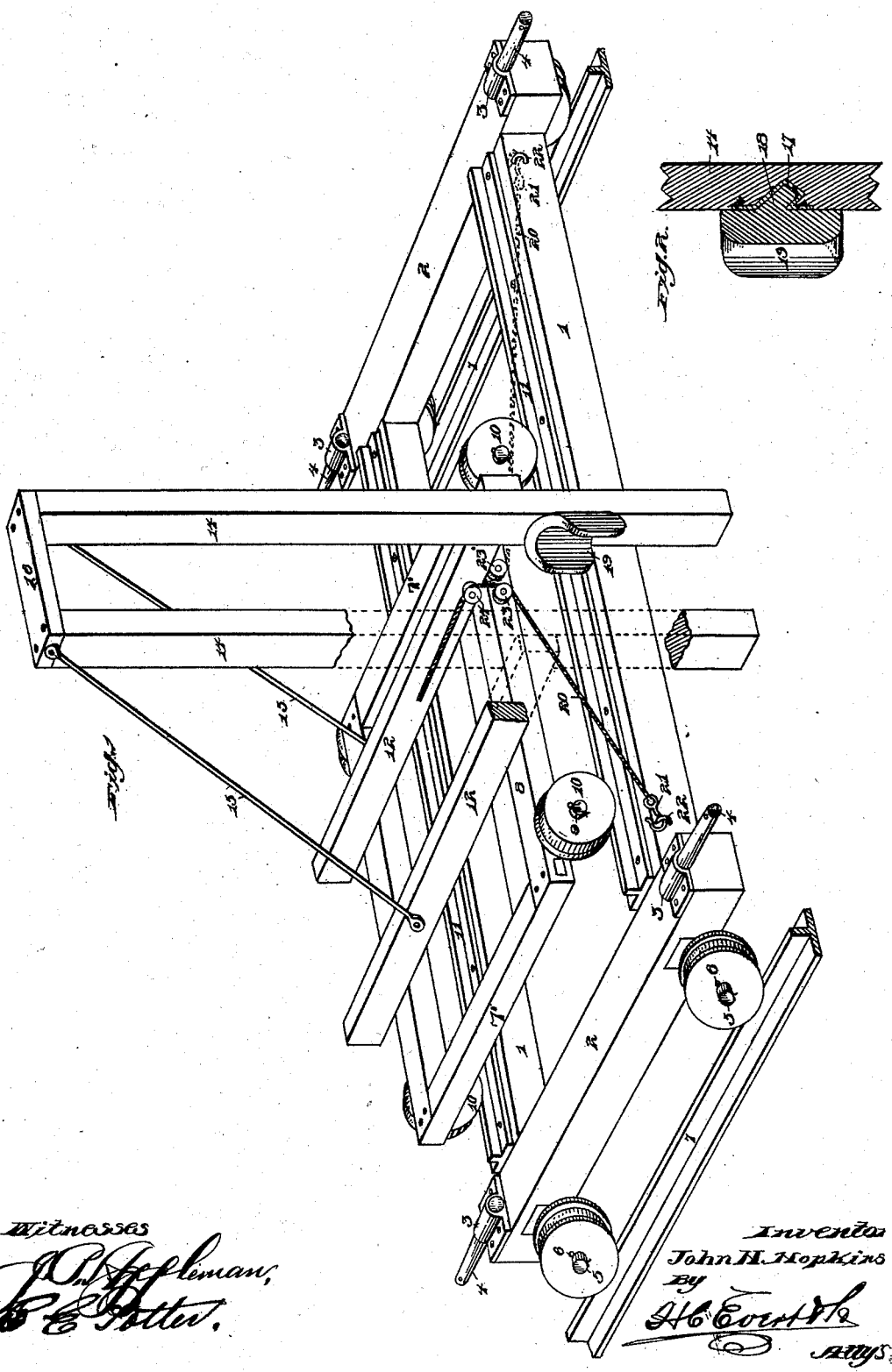
Witnesses
Inventor
John H. Hopkins

UNITED STATES PATENT OFFICE.

JOHN H. HOPKINS, OF PUNXSUTAWNEY, PENNSYLVANIA.

PILE-DRIVER.

SPECIFICATION forming part of Letters Patent No. 705,586, dated July 29, 1902.

Application filed October 22, 1901. Serial No. 79,497. (No model.)

*To all whom it may concern:*

Be it known that I, JOHN H. HOPKINS, a citizen of the United States of America, residing at Punxsutawney, in the county of Jefferson and State of Pennsylvania, have invented certain new and useful Improvements in Pile-Drivers, of which the following is a specification, reference being had therein to the accompanying drawings.

This invention relates to certain new and useful improvements in pile-drivers, and has for its object to construct a pile-driver which may be moved longitudinally and transversely of the work.

A further object of the invention is to provide novel means whereby the device may be moved from place to place without loading and also novel means for shifting the engine and pile-driver without the movement of the main truck.

A still further object of the invention is to provide novel means for guiding the pile and holding the same so that it may be driven in a perfectly straight manner.

Briefly described, the invention comprises a main truck and a supplemental or auxiliary truck mounted on the main truck and movable thereon independently of the main truck. The engine by means of which the pile-driver is operated is adapted to be mounted upon the supplemental or auxiliary truck, and means is connected to this engine whereby the auxiliary or supplemental truck may be moved longitudinally of the main truck without movement of the latter, so as to bring the driver into position for the driving of a series of piles in a row without necessitating the movement of the main truck.

In describing the invention in detail reference is had to the accompanying drawings, forming a part of this specification and wherein like numerals of reference indicate like parts throughout the several views, in which—

Figure 1 is a detailed perspective view of my improved driver, partly broken away the better to show the various parts. Fig. 2 is a vertical sectional view of a part of one of the guiding-uprights for the hammer, showing the removable guide for the pile secured thereto.

To put my invention into practice, I provide a main truck consisting of side rails 1 and end rails 2, the latter being rigidly connected to the side rails by mortising or other approved manner. The end rails 2 project beyond the outer face of the side rails 1, and upon the upper face of these projecting ends are mounted bearings 3, in which is secured a short axle 4. These end rails 2 also carry axles 5, which may be secured in bearings of the same form as the bearings and secured to the underneath face of the end rails 2. These axles 5 have wheels 6 mounted thereon, which may travel on tracks 7 or rest upon the ground, according to the conditions that exist where the device is being operated. These wheels 6 are preferably held by a key which is readily removable, so that the wheel may be removed from the axles 5 and placed upon the axles 4 in order that the main truck may be moved longitudinally when desired. The supplemental truck is mounted upon the main truck and consists of side rails 8 and end rails 7', suitably connected together, the said side rails 8 carrying axles 9, which have wheels 10 mounted thereon to travel on the rails 11, that are mounted on the side rails 1 of the main truck. Mounted on the supplemental truck and extending transversely thereof are two bars 12, upon which the operating-engine (not shown) is adapted to be mounted. These bars 12 are connected to the uprights 14, which form a guide for the pile-driver. (Not shown.) Brace-rods 15 are preferably connected either to the uprights 14 near their upper end or to the cross-piece 16, which connects the uprights together and to the bars 12. Each of the uprights 14 is provided at its inner face near the lower end with an inclined recess, in which is placed a socket 17. This socket is adapted to receive an angular projection 18, which is formed integral with the concave guide 19, adapted to receive the pile that is being driven. Where driving piles of less diameter, two of these guides may be employed, one on each of the uprights, and in piles of a larger diameter one guide will be sufficient to hold the pile in a perfectly vertical manner. In order to move the auxiliary or supplemental truck longitudinally of the work, so that a number of piles may be driven in a row without movement of the main truck, I employ a shifting device, which consists of a rope or cable 20, carrying on one end a hook 21, adapted to be connected in a staple 22, carried near the end of one of the side rails 1. The other end of this cord or cable is wound around the drum or the like carried by the engine, and the rope or cable passes over pulleys 23 24 or pulleys 23' 24. It will be observed that when this rope is wound around the drum, being connected in the manner shown in full lines in Fig. 1, the rope or cable will be in engagement with the pulleys 23 24, and the auxiliary or supplemental truck will be moved toward the left, while were the rope or cable connected to the staple or eye near the opposite end of the main truck the said rope would be in engagement with pulleys 23' 24, and the winding of the same upon the drum would cause the auxiliary or supplemental truck to be moved toward the right.

It will be noted that various changes may be made in the details of construction without departing from the general spirit of my invention.

Having fully described my invention, what I claim as new, and desire to secure by Letters Patent, is—

1. In a device of the character described, the combination of a main truck having supplementary axles to receive the wheels of said trucks whereby the truck may be moved longitudinally or transversely, of an auxiliary truck mounted upon said main truck, pulleys carried by said auxiliary truck, and a rope or the like passing over said pulleys and secured to said main truck whereby the auxiliary truck may be moved independently of the main truck, substantially as described.

2. In a pile-driver, a main truck having axles carrying wheels secured thereto, supplementary axles secured to said main truck transverse to said first-named axles, whereby the said wheels may be removed from said first-named axles and secured to said supplementary axles to enable the truck to move in a transverse direction, a supplementary truck movably mounted on said main truck, and a rope or the like engaging the said supplementary truck and secured to said main truck whereby the supplementary truck may be moved independently of the main truck, substantially as described.

In testimony whereof I affix my signature in the presence of two witnesses.

JOHN H. HOPKINS.

Witnesses:
JOHN NOLAND,
E. E. POTTER.